G. HARRIS.
Heaters for Cheese Vats, &c.
No. 156,251. Patented Oct. 27, 1874.
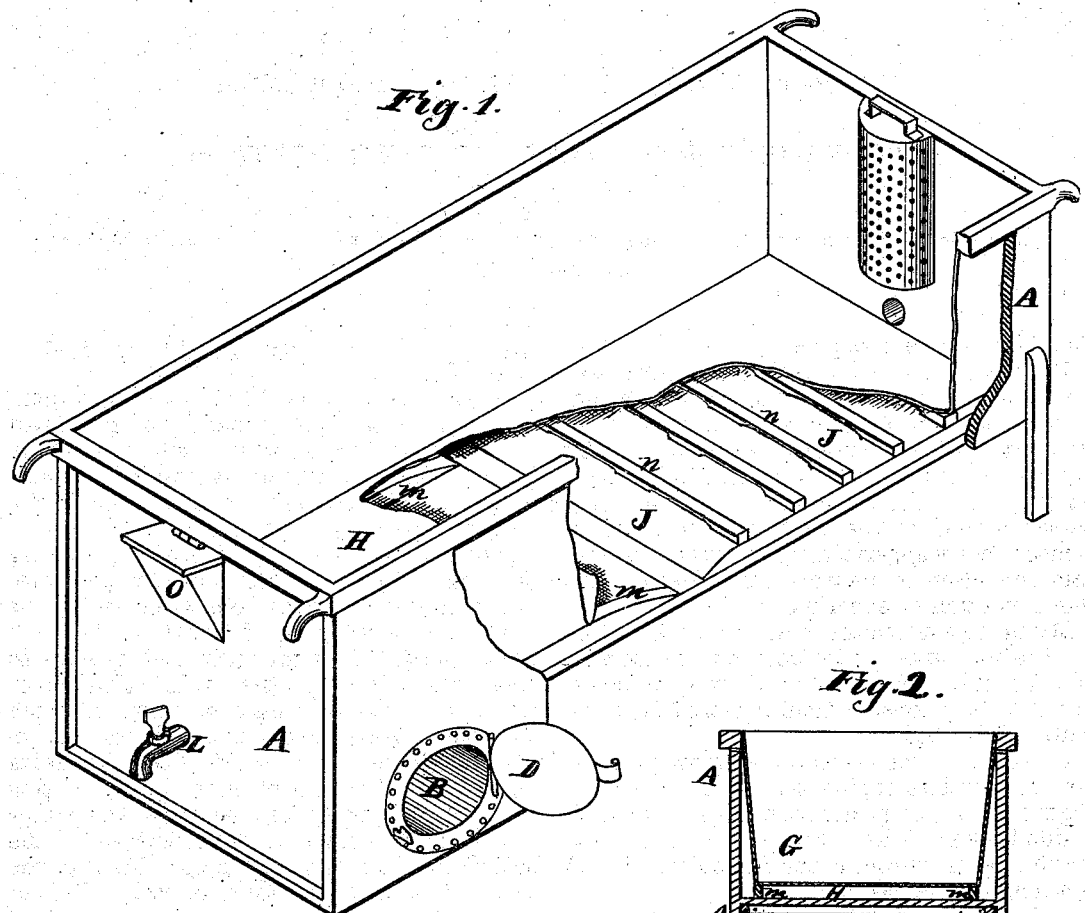
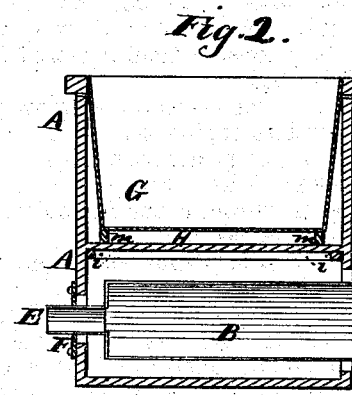
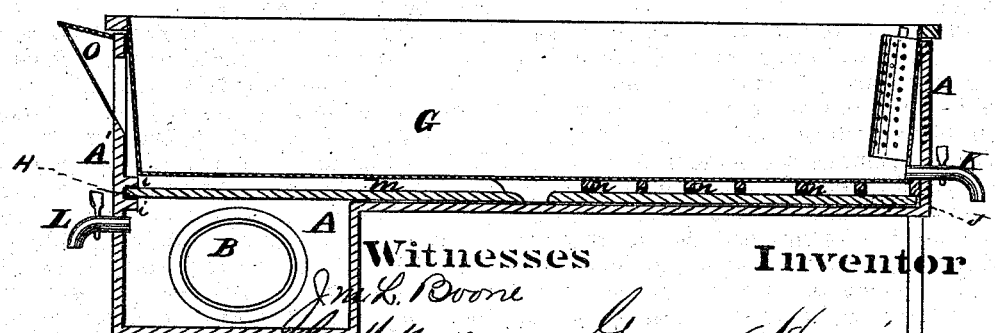
Witnesses: Inventor
George Harris
by Dewey &c.
Att'ys

UNITED STATES PATENT OFFICE.

GEORGE HARRIS, OF PETALUMA, CALIFORNIA.

IMPROVEMENT IN HEATERS FOR CHEESE-VATS, &c.

Specification forming part of Letters Patent No. 156,251, dated October 27, 1874; application filed September 4, 1874.

*To all whom it may concern:*

Be it known that I, GEORGE HARRIS, of Petaluma, Sonoma county, State of California, have invented an Improved Heater for Cheese-Vats and other purposes; and I do hereby declare the following description and accompanying drawings are sufficient to enable any person skilled in the art or science to which it most nearly appertains to make and use my said invention or improvement without further invention or experiment.

My invention relates to an improved device for heating water to be used for cheese-vats and for other purposes; and it consists in certain details of construction, as more fully hereinafter described.

Referring to the accompanying drawing for a more complete explanation of my invention, Figure 1 is a perspective view of my vat with a side broken away. Fig. 2 is a transverse section taken through the fire-place. Fig. 3 is a longitudinal section.

A is the vessel, within which the water is to be heated.

For the purposes of economy, it is necessary to construct this vessel of some substance which is a non-conductor of heat, and within which water can also be boiled. In order to meet these conditions, I construct the vessel A of wood.

In order to heat the water which is contained within this box or vessel, I construct a metallic fire-place, D, which is made of any desirable form, but preferably in transverse section, like an ellipse, and it nearly fills the vessel A. Openings are made in each end of the box A, the opening at one end being large enough to admit the fire-place without touching the wood. At this end the fire-place is left of its full diameter, and is provided with a flange, C, which turns outward, and is securely fastened to the outside of the vessel A, so as to be water-tight, thus leaving a narrow space all around the fire-place, which prevents the latter from touching the wood. At this end the fire-door D and grate are placed.

The opposite end of the fire-place may be reduced so as to form the flue E for the escape of the smoke, and this flue passes through an opening, enlarged similarly to the one just described, and provided with a flange, F, similar to C, which is also secured so as to be water-tight.

By this arrangement I am enabled to gain all the advantage of a metallic fire-place surrounded with water which will be quickly heated, while my containing vessel is of such material that the heat will be retained for a long time without radiation.

Much difficulty is experienced in keeping all parts of the vat at the same temperature; but in my device I accomplish this end by the use of a wooden cover, H, which fits over the heater portion A of the tank, and extends to about the middle of the tank. This cover rests upon narrow ledges or strips $i$, which just allow the heated water to pass out toward the middle of the tank. The vat G rests upon longitudinal strips $m$ on the top of this cover H, and also upon the transverse strips $n$, which are secured to the remainder of the bottom J. This bottom J is in a line with the cover H, so that the tank is really divided into a heating compartment and a distributing compartment. Beneath, the strips $n$ are perforated or hollowed out, so that the water as it comes from beneath the cover H can pass freely to the opposite end of the tank, while the longitudinal strips $m$ offer no obstruction to its free flow to the end over the heating-chamber, above the cover H.

By this construction I am enabled to produce a uniform temperature throughout the vat, and at a small expense of fuel.

When the work is finished, and the whey to be drawn off from the vat through the cock K, it is desirable to cool off the vat as quickly as possible. This can be done by drawing off the hot water down to a point below the cover H, by means of a cock, L, and then filling the space between the vat and the sides and bottom of the tank A with cold water through the trough $o$; but a small quantity of water will be needed for this cooling process, as the vat very nearly fills all the space close to the sides and bottom of the tank, and the water around the fire-place will be but little reduced in temperature, so that when necessary the whole can be speedily elevated to any desired temperature again.

I am aware that heaters of this description have heretofore been made with a wooden tank as a water-jacket, and an internal tank in combination with a fire-box. This I do not claim; but

Having thus described my invention, what I claim, and desire to secure by Letters Patent, is—

The intervening false bottom having ribs $m$ $n$, constructed as described, in combination with the tank A, fire-box B, and inside tank G, all constructed, arranged, and operated as set forth.

In witness whereof I hereunto set my hand and seal.

GEORGE HARRIS. [L. S.]

Witnesses:
 JNO. L. BOONE,
 C. M. RICHARDSON.